(12) United States Patent
Kulkarni et al.

(10) Patent No.: US 11,817,805 B2
(45) Date of Patent: Nov. 14, 2023

(54) BRUSHLESS MOTOR CONTROL

(71) Applicant: TEXAS INSTRUMENTS INCORPORATED, Dallas, TX (US)

(72) Inventors: Prasad Kulkarni, Bengaluru (IN); Sameer Pradeep Kulkarni, Bangalore (IN); Krushal Shah, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 115 days.

(21) Appl. No.: 17/514,804

(22) Filed: Oct. 29, 2021

(65) Prior Publication Data
US 2023/0134551 A1 May 4, 2023

(51) Int. Cl.
*H02P 21/00* (2016.01)
*H02P 21/22* (2016.01)

(52) U.S. Cl.
CPC .................................. *H02P 21/22* (2016.02)

(58) Field of Classification Search
CPC ......................................................... H02P 21/22
USPC ..................................................... 318/400.02
See application file for complete search history.

(56) References Cited

U.S. PATENT DOCUMENTS

| | | | |
|---|---|---|---|
| 10,112,495 B2* | 10/2018 | Elshaer et al. | B60L 53/12 |
| 2013/0221894 A1* | 8/2013 | Larsson et al. | H02P 6/182 |
| | | | 318/696 |
| 2020/0403543 A1* | 12/2020 | Imamura | B62D 5/04 |

\* cited by examiner

*Primary Examiner* — Erick D Glass
(74) *Attorney, Agent, or Firm* — Valerie M. Davis; Frank D. Cimino

(57) ABSTRACT

In some examples, an apparatus operable to drive a motor includes driver circuitry adapted to be coupled to the motor and processing logic coupled to the driver circuitry. The processing logic is operable to determine an expected current for controlling the motor, reduce a reference current upon which the motor is controlled from a first value to a second value at an exponential rate, determine that a measured current of the motor is approximately equal to the expected current, and responsive to determining that the measured current of the motor is approximately equal to the expected current, provide a control signal to the driver circuitry based on the expected current to the motor to control the motor to operate according to closed loop control.

20 Claims, 2 Drawing Sheets

US 11,817,805 B2

1
BRUSHLESS MOTOR CONTROL

BACKGROUND

A brushless motor is a type of motor in which speed and torque of the motor are controlled by providing electric currents to wires/windings wrapped around portions of a stator to create magnetic fields. The magnetic fields interact with permanent magnets incorporated into a rotor to cause motion of the rotor by the motor. Accordingly, a brushless motor may be referred to as an electronically commutated motor. Brushless motors may be controlled via alternating current (AC) or direct current (DC) electrical signals. For a brushless motor controlled via DC electrical signals, a controller provides control signals that are switched and provided as the DC electrical signals to windings of the motor to create the magnetic fields. The controller alternates or switches the control signals in such a manner as to change a phase of the windings to cause variation in the magnetic fields. The variation may cause the magnetic fields to rotate. A rotor of the motor includes the permanent magnets affixed to the rotor. The control signals may be varied to cause a phase and/or amplitude of the DC electrical signals to vary, thereby varying the speed and/or torque of the motor through the variations in the magnetic fields. The permanent magnets may be attracted to the magnetic fields such that the magnetic fields cause the permanent magnets to follow the motion of the magnetic fields as they rotate, resulting in rotation of the rotor. The rotor may be affixed to another device to provide the rotation of the rotor to the other device as a mechanical rotational force.

SUMMARY

In some examples, an apparatus operable to drive a motor includes driver circuitry adapted to be coupled to the motor and processing logic coupled to the driver circuitry. The processing logic is operable to determine an expected current for controlling the motor, reduce a reference current upon which the motor is controlled from a first value to a second value at an exponential rate, determine that a measured current of the motor is approximately equal to the expected current, and responsive to determining that the measured current of the motor is approximately equal to the expected current, provide a control signal to the driver circuitry based on the expected current to the motor to control the motor to operate according to closed loop control.

In some examples, a method of operating a motor includes determining an expected current for controlling the motor according to closed loop control, reducing a reference current upon which the motor is controlled from a first value to a second value at an exponential rate, determining that an angle error of the motor is less than a threshold, and responsive to determining that the angle error of the motor is less than the threshold, providing a control signal based on the expected current to the motor to control the motor to operate according to closed loop control.

In some examples, a system includes a motor, an inverter coupled to the motor, a sensor coupled to the motor, and a controller coupled to the inverter and the sensor. The controller is operable to receive a feedback signal from the sensor, the feedback signal indicating a measured current of the motor, determine an expected current for controlling the motor according to closed loop control based on the measured current and an angle error of the motor, reduce a reference current upon which the motor is controlled from a first value to a second value at an exponential rate, determine that the angle error is less than a threshold, and responsive to determining that the angle error is less than the threshold, provide control signals to the inverter based on the expected current, the control signals to cause the inverter to control the motor to operate according to closed loop control.

BRIEF DESCRIPTION OF THE DRAWINGS

For a detailed description of various examples, reference will now be made to the accompanying drawings.

The same reference numbers or other reference designators are used in the drawings to designate the same or similar (functionally and/or structurally) features.

DETAILED DESCRIPTION

Figure 1:
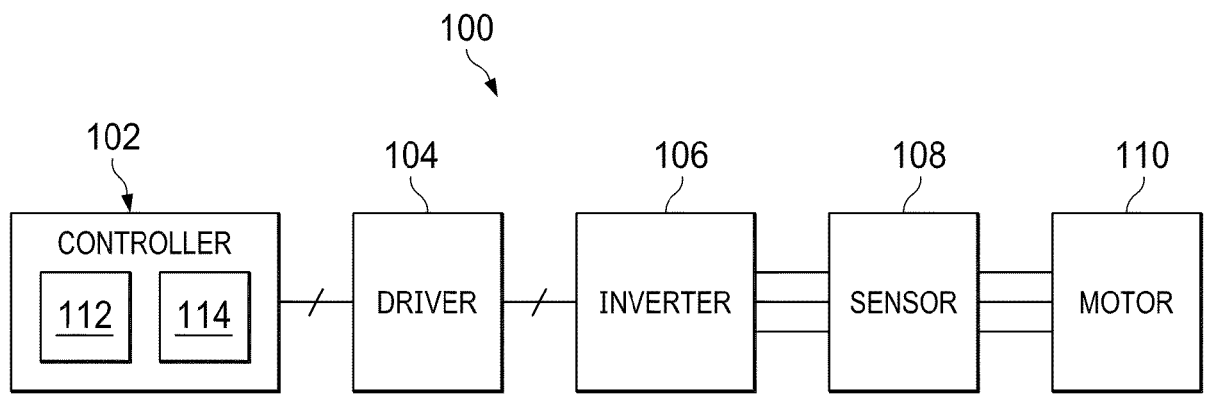
FIG. 1 is a block diagram of an example motor system, in accordance with various examples.

A brushless motor can be controlled in open loop control or closed loop control. In open loop control, the motor is controlled without knowledge of a particular angular position of the motor (e.g., there is no position feedback for a portion of the motor that is in motion). In closed loop control, an angular position of the motor is known (e.g., some form of position information for the portion of the motor that is in motion is known). For example, in a closed loop system, position information may be provided to the controller and may be useful for the controller in providing the control signals to control the motor. In some approaches, the position information may be provided via sensors that directly measure a position of the rotor. Other approaches may sense or infer the rotor position, such as by measuring a back or counter electromotive force (back-EMF) in the windings not being driven at a given time. A controller in such implementations that do not include a sensor to directly measure the position of the rotor may be referred to as a sensorless controller.

Some challenges may exist with the implementations that include sensorless controllers. For example, back-EMF may not be produced while the rotor is stationary (e.g., when the motor is not in motion). Thus, as the controller controls the motor to begin rotating, position information of the rotor may not be initially known. As such, a brushless motor under control by a sensorless controller (a combination which may be referred to as a brushless, sensorless motor) may begin operation in open loop control and then transition to closed loop control after some amount of time. The amount of time may be a time sufficient for back-EMF to develop in the motor and for the controller to measure the back-EMF and infer the angular position of the rotor. In some systems, an amount of current provided to a brushless, sensorless motor in open loop control may be greater than an amount of current provided to the brushless, sensorless motor in closed loop control. However, the current provided to the motor may not change instantly in response to the change from open loop to closed loop control. Thus, the motor may momentarily receive excessive current at a time of transition open loop control to closed loop control. Excessive current, as used herein, may be current having an amount greater in value than corresponds to a speed for which a motor is being controlled to rotate. The excessive current may cause a speed bump in a rotational speed of the motor. A speed bump, as used herein, may be a momentary increase in rotational speed of a motor that results from the motor momentarily receiving an excessive amount of current. The speed bump may degrade performance of the motor and/or adversely affect operation of the motor or suitability of the motor for operation in particular application environments.

Aspects of this description provide for control of a brushless, sensorless motor that mitigates the occurrence of a speed bump in response to a change from open loop to closed loop control of the motor. In some examples, the control may be implemented via a programmed implementation, such as via a software-based finite state machine or other processing or decision-making logic (e.g., a processor, an application specific integrated circuit, and/or digital logic which may also include memory and/or latches) that executes machine-executable code. The control may provide for determining an estimate of an expected current value for controlling the motor in closed loop control and reducing a current provided to the motor from a first current value being provided at a given time to approximately the expected current value responsive to a trigger event. The estimate may be determined based on an angle error of the motor and a current being received by the motor. In at least some examples, the trigger event may be feedback current measured from the motor having a value approximately equal to a reference current received by the controller. The reduction in current from the first current value to the approximately expected current value may be performed exponentially to maintain stable operation of the motor (e.g., such that mechanical dependencies of inertia, load, etc. are taken into consideration). As used herein, stable operation of a motor includes the motor continuing to operate at a commanded or programmed speed without stalling or losing synchronization with an applied current frequency. In at least some examples, the reduction in current may be performed until an error angle of the motor is determined to be less than a threshold amount, which may be a proxy for representing the motor operating at the expected current value in closed loop control.

FIG. 1 shows a block diagram of an example motor system 100, in accordance with various example. The motor system 100 may be generally representative of any system in which a motor is controlled by a controller, regardless of a particular application environment for the motor system 100. In some examples, the motor system 100 includes a controller 102, a driver 104, an inverter 106, a sensor 108, and a motor 110. In at least some examples, the controller 102 includes processing logic 112 that may be configured to execute machine-executable instructions 114 (which may be stored in memory included in controller 102 or memory external to controller 102), among other functions. In some examples, the machine-executable instructions 114 may cause the processing logic 112 to implement or execute a software-based finite state machine, or other logical mechanism, to provide control signals to the driver 104. The driver 104 may receive control signals from the controller 102 as comparatively low-current signals and convert the signal to comparatively high-current drive signals. The driver 104 provides the drive signals to the inverter 106. The inverter 106 controls the frequency of power supplied to the motor 110. For example, the inverter 106 receives the drive signals from the driver 104 as DC signals and switches the drive signals to form motor control signals (such as pulse-frequency modulated (PFM) or pulse-width modulated (PWM) signals). The inverter may switch the drive signals at a switching rate controlled to vary the frequency of the motor control signals to simulate an AC signal at the motor 110. The sensor 108 may measure an output of the inverter 106 (such as the voltage at and/or current to one or more of the terminals to motor 110 - as shown in FIG. 1, there are three terminals for motor 110 when motor 110 is a three-phase motor) and/or characteristics (such as rotor speed, position and/or torque, and/or back-EMF) of the motor 110 to determine feedback signals.

The controller 102 may receive the feedback signals from the inverter 106 and/or the sensor 108. In at least some examples, at least some of the feedback signals are unavailable, have unreliable data, or have data not representative of a current condition of the motor 110 while the motor 110 is stationary or for an amount of time after movement of the motor 110 begins following the motor 110 having been stationary ("Open-loop Time"). Thus, for the amount of time after movement of the motor 110 begins following the motor 110 having been stationary, an accurate rotor position (e.g., angular position) of the motor 110 may not be known or calculable by the controller 102. Control of the motor 110 by the controller 102 while the controller 102 does not have accurate information regarding rotor position of the motor 110 may be referred to as open loop control. Following the Open-loop Time, the controller 102 estimates an angle error of the motor 110 based on the feedback signals. In at least some examples, the controller 102 may determine that the Open-loop Time has expired based on the feedback signals indicating that a value of a back-EMF of the motor 110 in a q-axis direction is greater than a threshold amount (such as about 95%) of the total back-EMF of the motor 110. The angle error may be a difference between an estimated position or angle of the rotor of the motor 110 and a commanded (e.g., via the control signals) position or angle of the rotor of the motor 110.

The controller 102 may also receive a reference angle error value. In some examples, the reference angle error value is received dynamically by the controller 102 from another component (not shown) external to the controller 102, such as may be adjusted or programmed by a user or the another component. In other examples, the controller 102 obtains the reference angle error value from a storage location (not shown) such as a memory, register, or other storage device that may be a component of the controller 102 or implemented external to the controller 102. The reference angle error value may be a proxy for (e.g., representative of) an estimated current value for controlling the motor 110 in closed loop control. In at least one example, the reference angle error value is 5.72°. In other examples, the reference angle error value has any other suitable value. In at least some examples, the reference angle has a value between 0 and 15 degrees. In other examples, the reference angle has a value between 0 and 10 degrees or between 0 and 5 degrees.

The controller 102 may compare the angle error to the reference angle error value to determine whether the angle error is less than or equal to the reference angle error value. Responsive to the angle error not being less than or equal to the reference angle error value (e.g., the angle error being greater than the reference angle error value), the controller 102 may reduce a value of a reference current ($I_{qRef}$), which may be provided based on user input and/or any other suitable consideration or feedback signal. In some examples the controller 102 reduces the value of $I_{qRef}$ exponentially rather than linearly. The exponential reduction in value of $I_{qRef}$ may maintain stability of the motor 110, in comparison to a linear reduction in $I_{qRef}$ which, in some examples, may cause the motor 110 to lose stability. In at least some examples, the exponential reduction in value is performed at a rate of:

$$I_{qRef} = X * I_{qRef}(1 + \cos(\theta_{err})),  \quad (1)$$

where $\theta_{err}$ is the angle error of the motor 110. In various examples, the constant X may be varied to control a rate of decrease in the value of $I_{qRef}$, such that the rate in value of decrease of $I_{qRef}$ decreases as the constant X increases in value. X may have a value in the interval (0,1) and, in at least one example, may have a value of 0.5.

Responsive to the angle error being less than or equal to the reference angle error value, the controller 102 may begin controlling the motor 110 according to closed loop control. In the closed loop control, the motor 110 provides the control signals at least partially based on the feedback signals, as described herein. In at least some examples, a controller controlling a motor and determining a motor rotor position may be further understood with reference to U.S. Pat. Application no. 17/363,646, filed on Jun. 30, 2021 and entitled "Method for Determining a Position of a Rotor at Standstill," which is incorporated herein by reference in its entirety.

Figure 2:
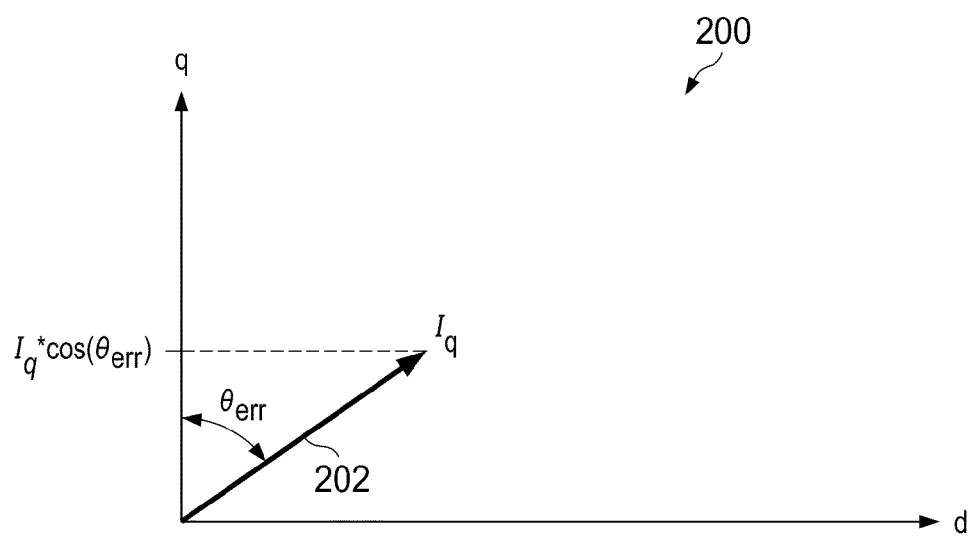
FIG. 2 is a diagram of a d,q reference frame, in accordance with various examples.

FIG. 2 shows a diagram of a d,q reference frame 200, in accordance with various examples. In at least some examples, the frame 200 represents a current space vector 202 of the motor 110 with respect to d and q axes. The current space vector 202 has a magnitude of $I_q$ and is representative of a peak value of current flowing in phases of the motor 110. Accordingly, reference may be made in describing FIG. 2 to components of FIG. 1. The d axis, or direct axis, is an axis by which flux is produced by a winding (not shown) of the motor 110. The q axis, or quadrature axis, is an axis by which torque is produced by the motor 110. Each of the d axis and the q axis may be single-phase representations of magnetic flux, caused by variations in signals provided to the motor 110 based on the control signals provided by the controller 102, that is contributed to by separate sinusoidal signal phase components for signals received by the motor 110 from the inverter 106.

As shown by the frame 200, in at least some examples of operation of the motor 110, the current space vector 202 may not be aligned with the d axis or the q axis. In such examples, an angle existing between the current space vector 202 and the q axis may be an angle error of the motor 110, as described above and noted in FIG. 2 as $\theta_{err}$. A projection of the current space vector 202 on the q axis may indicate the expected current value, which may be noted as $I_{qExpected}$, for controlling the motor 110 in closed loop control. The projection of the current space vector 202 may be determined according to:

$$I_{qExpected} = I_q * \cos(\theta_{err}), \quad (2)$$

as shown in the frame 200. Thus, the expected current value may be estimated, determined, or otherwise calculated based on a present current value of the motor 110 and the angle error of the motor 110. In at least some examples, a process for determining or forming the d,q reference frame 200 may be further understood with reference to U.S. Pat. Application no. 17/363,571, filed on Jun. 30, 2021 and entitled "A Motor Controller and a Method for Controlling a Motor," which is incorporated herein by reference in its entirety.

Figure 3:
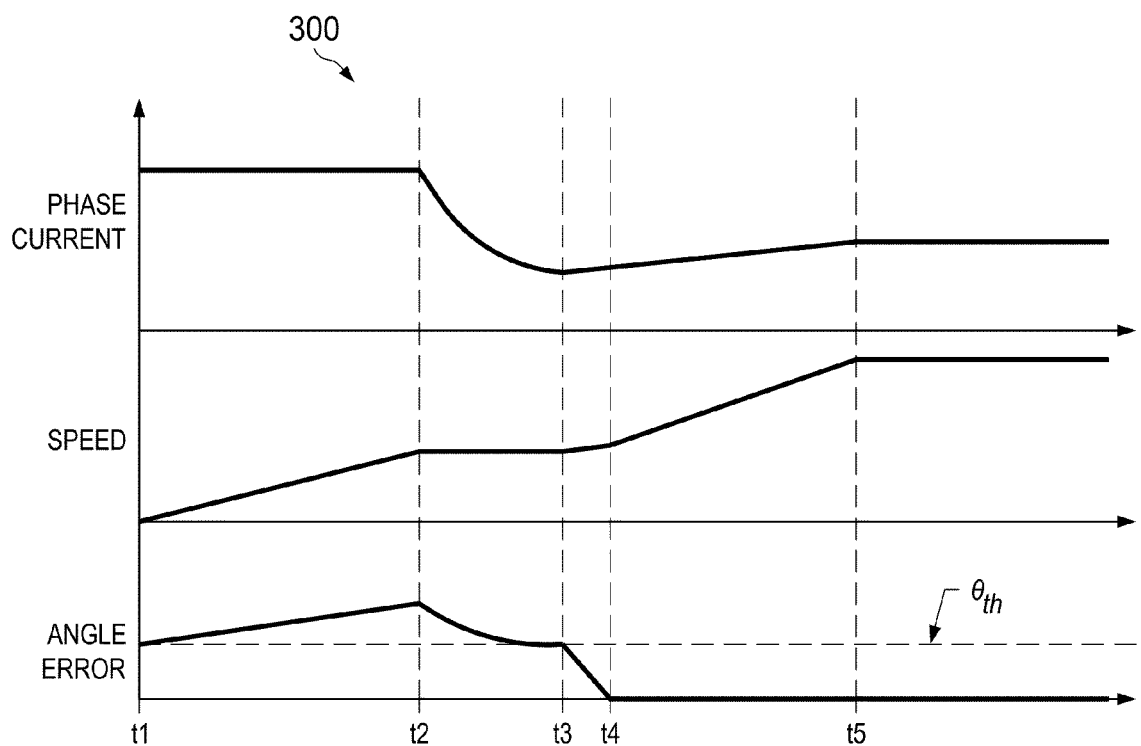
FIG. 3 is a signal diagram of signals in a motor system, in accordance with various examples.

FIG. 3 shows a signal diagram 300 of signals in a motor system, in accordance with various examples. The diagram 300 may be representative of at least some signals that may be present in the motor system 100 of FIG. 1. Accordingly, reference may be made in describing FIG. 3 to components and/or signals of FIG. 1. The diagram 300 shows a phase current (representative of a peak value of current flowing in any phase of the motor 110 at a given time - such current may be flowing through one or more of the three conductors shown between inverter 106 and motor 110), a speed, and the angle error of the motor 110 over different operational periods. For example, a period of time between t1 and t2 may be a period of acceleration of the motor 110, controlled by the controller 102 according to open loop control. A period of time between t2 and t3 may be a period of exponential current reduction by the controller 102, such as based on a determined $I_{qExpected}$, as described above herein. A period of time between t3 and t4 may be a period of angle error correction by the controller 102 resulting from the exponential current reduction performed between times t2 and t3. A period of time between t4 and t5 may be a period of acceleration of the motor 110, controlled by the controller 102 according to closed loop control. A period of time continuing on from t5 may be a steady state of control of the motor 110 by the controller 102 (e.g., such as maintaining the motor 110 at a substantially constant speed).

As shown by the diagram 300, during open loop acceleration of the motor 110 (e.g., the time between t1 and t2), angle error of the motor 110 increases linearly with speed. Responsive to a feedback current of the motor 110 becoming approximately equal to $I_{qRef}$, the controller 102 reduces the phase current at an exponential rate based on a determined $I_{qExpected}$, as described above with reference to the time between t2 and t3. Correspondingly, the rate of increase of the speed of the motor 110 may be reduced (possibly to zero rate of increase), and the angle error of the motor 110 may decrease proportional to the decrease in phase current. Responsive to the angle error of the motor 110 decreasing to be no greater than a threshold, noted in FIG. 3 as $\theta_{th}$, indicated by a reference angle error value, the controller 102 ceases reducing the phase current and performs angle error correction (as discussed below). The angle error correction, in some examples, may reduce the angle error of the motor 110 to be approximately zero. In some examples, the controller 102 performs the angle error correction during a transition from open loop control of the motor 110 to closed loop control of the motor 110 (e.g., prior to beginning closed loop control). Following the angle error correction, the controller 102 controls the motor 110 to operate according to closed loop control, accelerating to and remaining substantially at a programmed speed for the motor 110.

Figure 4:
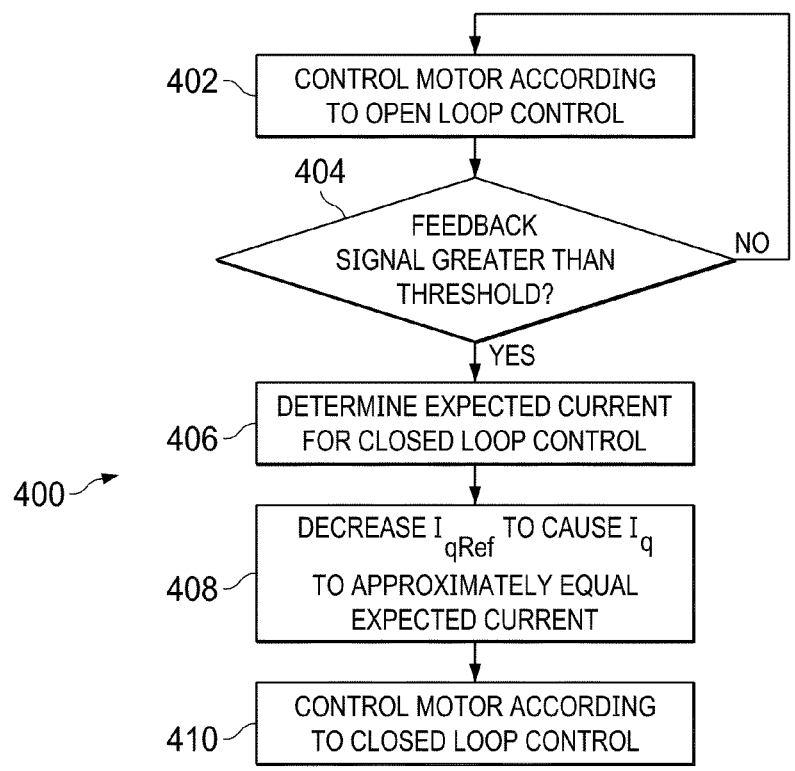
FIG. 4 is a flowchart of a method for controlling a motor, in accordance with various examples.

FIG. 4 shows a flowchart of a method 400 for controlling a motor, in accordance with various examples. In at least some examples, the method 400 is implemented at least in part by the controller 102 to control the motor 110, each of the motor system 100 of FIG. 1. Accordingly, reference may be made in describing FIG. 4 to components and/or signals of FIG. 1. The method 400, in some examples, provides for mitigation of a speed bump in a transition from open loop control to closed loop control of a brushless, sensorless motor, such as the motor 110.

At operation 402, the controller 102 controls the motor 110 to operate according to open loop control. During open loop control, the controller 102 may not have knowledge of a rotational position of the motor 110 (e.g., such as of a rotor of the motor 110). Therefore, in open loop control the controller 102 may provide control signals for use in controlling the motor 110 irrespective of the rotational position of the motor 110. As discussed above, operation under open loop control occurs, in some example examples, during a time period after the motor starts operating after the rotor has been stationary or during a time period while accurate information regarding the position and/or speed of the rotor is not available.

At operation 404, the controller 102 determines whether a received feedback signal has a value approximately greater than a threshold. In at least some examples, the received feedback signal is representative of a phase current of the motor 110 and is useful in estimating a back-EMF of the motor 110. Responsive to the estimated back-EMF not exceeding the threshold, the controller 102 returns to operation 402 and continues to control the motor 110 according to open loop control. Responsive to the estimated back-EMF exceeding the threshold, the controller 102 proceeds to operation 406. The threshold may be a percentage amount of the received feedback signal that is in a q axis direction of a d,q reference frame, such as the d,q reference frame 200 of FIG. 2, described above.

At operation 406, the controller 102 determines an expected current for controlling the motor 110 according to closed loop control. For example, for controlling the motor 110 to operate at a first speed in open loop control, $I_{qRef}$ may have a first value. However, for controlling the motor 110 to operate at the first speed in closed loop control, $I_{qRef}$ may have a second value that is less than the first value. Accordingly, if the controller 102 continues to provide control signals to the motor 110 based on $I_{qRef}$ having the first value, while controlling the motor 110 to operate according to closed loop control, a speed bump in a speed of the motor 110 may occur. The speed bump may be disadvantageous for various reasons, as described above. Thus, the controller 102 may determine an expected current for controlling the motor 110 for a particular speed in closed loop control. The controller 102 may determine the expected current based on equation (2) where $I_{qExpected}$ is the expected current value, $I_q$ is a current of the motor 110 determined according to the feedback signals, and $\theta_{err}$ is the angle error of the motor 110.

At operation 408, the controller 102 decreases a value of $I_{qRef}$ to cause $I_q$ to approximately equal the expected current. The decrease in value of $I_{qRef}$ may be performed exponentially, such as described above. In at least some examples, the controller 102 decreases the value of $I_{qRef}$ until an angle error of the motor 110 is no greater than a reference angle error value, such as described above. Accordingly, in some examples, the reference angle error is a proxy for the expected current and $I_q$, and the angle error of the motor 110 is a proxy for $I_{qRef}$. Thus, the controller 102 may decrease the value of $I_{qRef}$ until the angle error of the motor 110 is determined to be no greater than the reference angle error, thereby indicating that $I_{qRef}$ is approximately equal to $I_q$ and the expected current. The controller 102 decreasing the value of $I_{qRef}$ to cause $I_q$ to approximately equal the expected current, in some examples, mitigates the creation of a speed bump in a speed response of the motor 110 while transitioning from open loop control to closed loop control.

At operation 410, the controller 102 controls the motor 110 to operate according to closed loop control. During closed loop control, the controller 102 receives accurate information of a rotational position of the motor 110 (e.g., such as of a rotor of the motor 110) via the feedback signals received by the controller 102. Therefore, in closed loop control the controller 102 may provide control signals for use in controlling the motor 110 based at least in part on the rotational position of the motor 110. In some examples, a current provided to the motor 110 for controlling the motor 110 to operate at a given speed is less in closed loop control than in open loop control.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more components may be adapted to be coupled to at least some of the components to form the described structure either at a time of manufacture or after a time of manufacture, such as by an end-user and/or a third-party.

Unless otherwise stated, "about," "approximately," or "substantially" preceding a value means +/- 10 percent of the stated value. Modifications are possible in the described examples, and other examples are possible within the scope of the claims.

What is claimed is:

1. An apparatus operable to drive a motor, comprising:
   driver circuitry adapted to be coupled to the motor; and
   processing logic coupled to the driver circuitry and operable to:
     determine an expected current for controlling the motor;
     reduce a reference current upon which the motor is controlled from a first value to a second value at an exponential rate;
     determine that a measured current of the motor is approximately equal to the expected current; and
     responsive to determining that the measured current of the motor is approximately equal to the expected current, provide a control signal to the driver circuitry based on the expected current to the motor to control the motor to operate according to closed loop control.

2. The apparatus of claim 1, wherein the expected current is equal to $I_q * \cos(\theta_{err})$, where $I_q$ is the measured current of the motor and $\theta_{err}$ is an angle error of the motor.

3. The apparatus of claim 1, wherein the exponential rate is $X * I_{qRef}(1 + \cos(\theta_{err}))$, where X is a constant value in an interval of (0,1), $I_{qRef}$ is the reference current, and $\theta_{err}$ is an angle error of the motor.

4. The apparatus of claim 1, wherein the motor is a brushless, sensorless motor.

5. The apparatus of claim 1, wherein an angle error of the motor is a proxy for the measured current of the motor and a reference angle error value is a proxy for the expected current, and wherein the processing logic determines that the measured current of the motor is approximately equal to the expected current by determining that the angle error of the motor is no greater than the reference angle error value.

6. The apparatus of claim 1, wherein the processing logic reduces the reference current to the second value responsive to determining that a value of the measured current of the motor is within a programmed range of a value of the reference current.

7. A method of operating a motor, the method comprising:
   determining an expected current for controlling the motor according to closed loop control;
   reducing a reference current upon which the motor is controlled from a first value to a second value at an exponential rate;
   determining that an angle error of the motor is less than a threshold; and
   responsive to determining that the angle error of the motor is less than the threshold, providing a control signal based on the expected current to the motor to control the motor to operate according to closed loop control.

8. The method of claim 7, wherein the expected current is equal to $I_q * \cos(\theta_{err})$, where $I_q$ is the measured current of the motor and $\theta_{err}$ is the angle error of the motor.

9. The method of claim 7, wherein the exponential rate is $X * I_{qRef}(1 + \cos(\theta_{err}))$, where X is a constant value in an interval of (0,1), $I_{qRef}$ is the reference current, and $\theta_{err}$ is the angle error of the motor.

10. The method of claim 7, wherein the motor is a brushless, sensorless motor.

11. The method of claim 7, further comprising prior to, and while determining the expected current, controlling the motor to operate according to open loop control.

12. The method of claim 7, wherein the angle error of the motor is a proxy for a measured current of the motor, the threshold is a reference angle error value that is a proxy for the expected current, and wherein determining that the angle error of the motor is less than the threshold indicates that the measured current of the motor is approximately equal to or less than the expected current.

13. The method of claim 12, wherein a speed increase in the motor that occurs responsive to a transition from open loop control to closed loop control has a relationship to the reference angle error value such that a decrease in the reference angle error value reduces the speed increase in the motor that occurs responsive to the transition from open loop control to closed loop control.

14. A system, comprising:
   a motor;
   an inverter coupled to the motor;
   a sensor coupled to the motor;
   a controller coupled to the inverter and the sensor, the controller operable to:
      receive a feedback signal from the sensor, the feedback signal indicating a measured current of the motor;
      determine an expected current for controlling the motor according to closed loop control based on the measured current and an angle error of the motor;
      reduce a reference current upon which the motor is controlled from a first value to a second value at an exponential rate;
      determine that the angle error is less than a threshold; and
      responsive to determining that the angle error is less than the threshold, provide control signals to the inverter based on the expected current, the control signals to cause the inverter to control the motor to operate according to closed loop control.

15. The system of claim 14, wherein the controller is to control the motor to operate according to open loop control prior to and while determining the expected current.

16. The system of claim 14, wherein the expected current is equal to $I_q * \cos(\theta_{err})$, where $I_q$ is the measured current of the motor and $\theta_{err}$ is the angle error.

17. The system of claim 14, wherein the exponential rate is $X * I_{qRef}(1 + \cos(\theta_{err}))$, where X is a constant value in an interval of (0,1), $I_{qRef}$ is the reference current, and $\theta_{err}$ is the angle error.

18. The system of claim 14, wherein the angle error of the motor is a proxy for a measured current of the motor, the threshold is a reference angle error value that is a proxy for the expected current, and wherein determining that the angle error of the motor is less than the threshold indicates that the measured current of the motor is approximately equal to or less than the expected current.

19. The system of claim 18, wherein a speed increase in the motor that occurs responsive to a transition from open loop control to closed loop control has a relationship to the reference angle error value such that a decrease in the reference angle error value reduces the speed increase in the motor that occurs responsive to the transition from open loop control to closed loop control.

20. The system of claim 14, wherein the motor is a brushless, sensorless motor.

* * * * *